United States Patent [19]

de Bergh et al.

[11] Patent Number: 4,469,916

[45] Date of Patent: Sep. 4, 1984

[54] METHOD AND APPARATUS FOR DETECTING SIGNALLING AND DATA SIGNALS ON A TELEPHONE CHANNEL

[75] Inventors: Guy de Bergh, Chatou; Jean-Claude Spitéri, Palaiseau, both of France

[73] Assignee: Compagnie Industrielle des Telecommunications Cit-Alcatel, Paris, France

[21] Appl. No.: 408,305

[22] Filed: Aug. 16, 1982

[30] Foreign Application Priority Data

Nov. 27, 1981 [FR] France .............................. 81 22241

[51] Int. Cl.³ ...................... H04M 11/06; H04B 3/20
[52] U.S. Cl. ................. 179/2 DP; 179/170.2
[58] Field of Search ............... 179/2 A, 2 AM, 2 DP, 179/5 R, 5 P, 170.2; 381/56

[56] References Cited

U.S. PATENT DOCUMENTS

| | | | |
|---|---|---|---|
| 3,069,501 | 12/1962 | Gilman et al. ................... | 179/2 DP |
| 3,647,993 | 3/1972 | Foulkes et al. .............. | 179/2 DP X |
| 3,859,462 | 1/1975 | Saxon ................... | 179/2 A |
| 3,935,403 | 1/1976 | Penicaud et al. ................. | 179/170.2 |
| 3,979,559 | 9/1976 | Roedel et al. ..................... | 179/2 DP |
| 4,352,962 | 10/1982 | LaMothe ..................... | 179/170.2 X |

FOREIGN PATENT DOCUMENTS 2240583 3/1975 France .

2031696 4/1980 United Kingdom .

OTHER PUBLICATIONS

IEEE Transactions on Communications vol. COM-26 No. 1 Jan. 1978-New York, p. 142, paragraph 4, "Dynamic Speech Detector N. 1".

R. F. Frankeny, "Voice Detector Circuit"; *IBM Technical Disclosure Bulletin*, vol. 20, No. 4, Sept. 1977 pp. 1282-1283.

*Primary Examiner*—G. Z. Rubinson
*Assistant Examiner*—Keith E. George
*Attorney, Agent, or Firm*—Sughrue, Mion, Zinn, Macpeak & Seas

[57] ABSTRACT

The presence of such signals is detected each time the following detection condition is satisfied, namely: that, for the duration of a predetermined "prior activity" period the amplitude of the signal on the telephone channel exceeds a threshold level while successive maximum values taken at short time intervals remain fairly constant in level. Apparatus for performing the method comprises a threshold level comparator (10) and a difference comparator (11) which control a detector (50) followed by a holdover circuit (60). The invention is particularly applicable to inhibiting echo suppressor circuits during telephone signalling or data transfer by telephone line.

13 Claims, 5 Drawing Figures

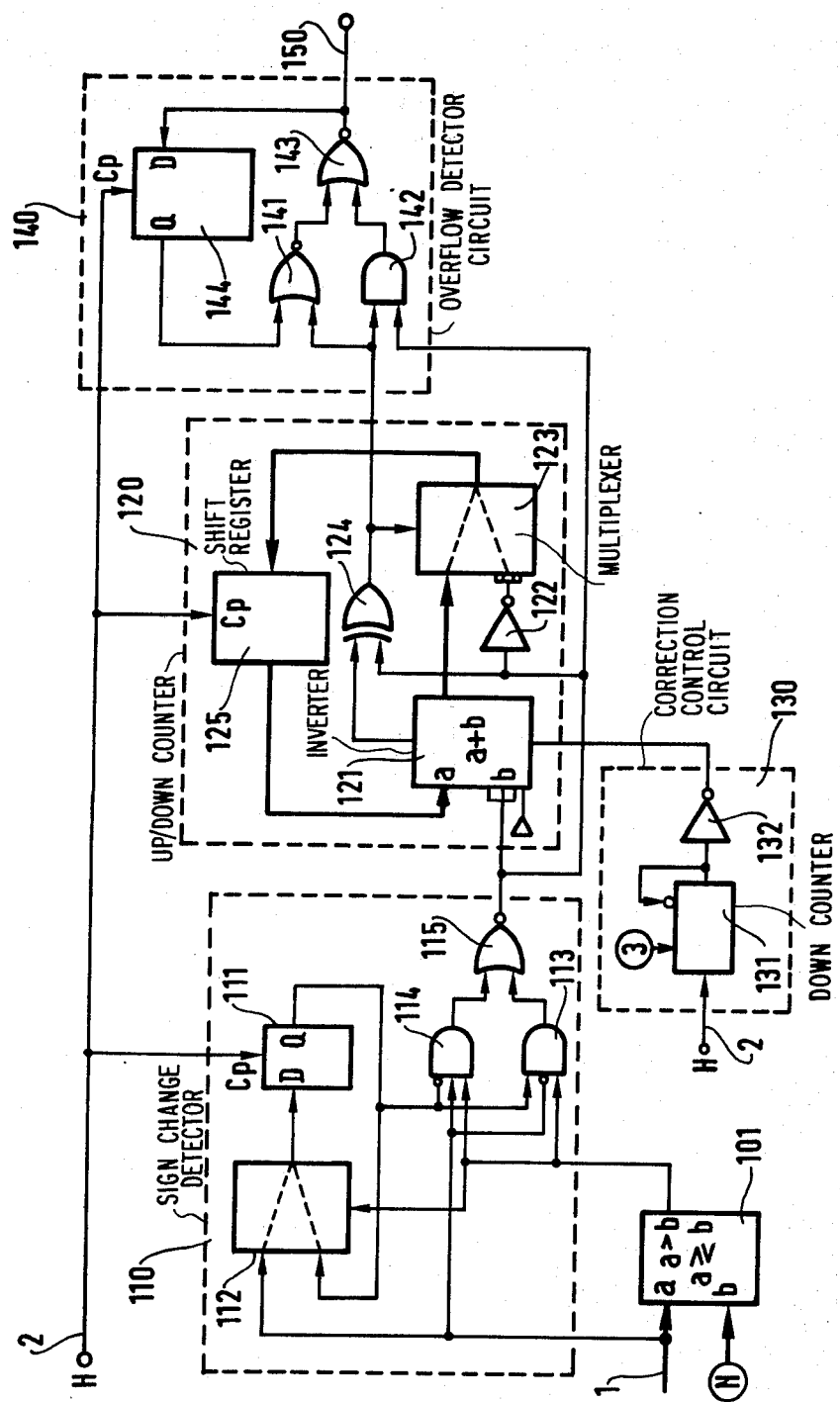

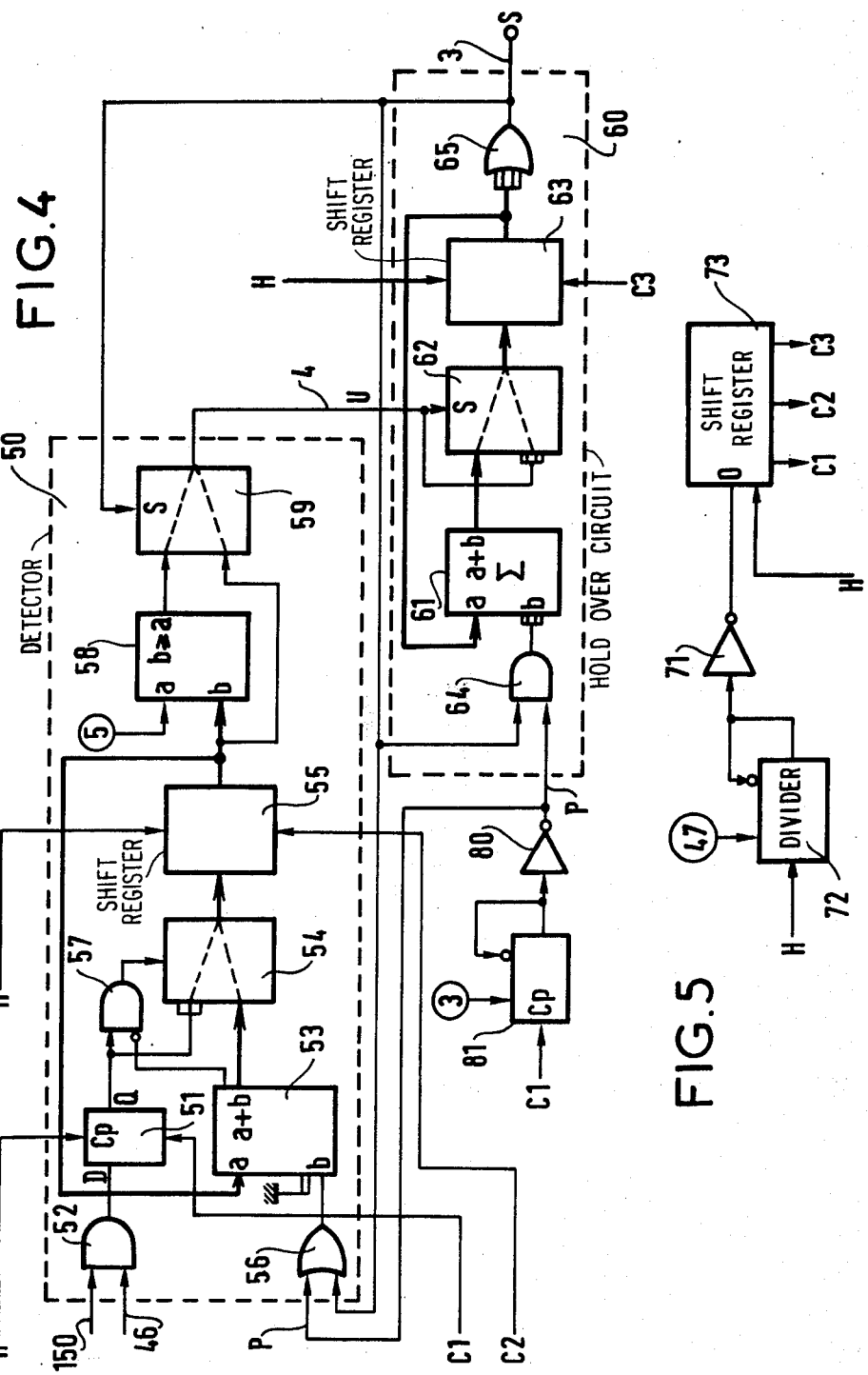

METHOD AND APPARATUS FOR DETECTING SIGNALLING AND DATA SIGNALS ON A TELEPHONE CHANNEL

The present invention relates to telephone transmission and concerns detecting data signals on a telephone channel, in particular the signals used for telephone signalling, and for the purpose of inhibiting echo suppressors during signalling.

BACKGROUND OF THE INVENTION

Telephone connections that use long distance four-wire circuits coupled to local two-wire circuits by means of hybrid couplers, give rise to echo phenomena due to imperfect balancing of the hybrid couplers. These echo phenomena are a great hindrance to a speaker once the echo delay exceeds 45 milliseconds, and unless the echos are attenuated speech becomes incomprehensible. To do this, echo suppressor devices are used which, when only one party is talking, apply a high degree of attenuation in the talking party's reception channel, and when both parties are talking apply a medium degree of attenuation to both directions of transmission. These devices may act by means of controlled attenuators inserted in the path of the speech signals, in which case they are actually called echo suppressors. However, they may also act by means of sensitivity controls on speech detectors in devices for concentrating telephone signals by assigning a physical speech channel to a party only when that party is talking, such devices are known under the initials TASI (or CELTIC in French) and they are used to increase the number of conversations which can be simultaneously carried over some connections of limited capacity.

This method of attenuating echos as commonly used for speech signals is not suitable for signalling and data signals which are very often simultaneously transmitted in both transmission directions, which means that the echo suppressor devices must either be inhibited or removed from circuit during data transmission or signalling.

One known way of detecting signalling and data signals on a telephone channel is based on an analysis of the frequencies in the telephone channel, and interpreting as speech any signals which include frequency components that do not belong to expected telephone signalling or data transmission schemes. However, this requires a quantity of filters which are expensive to implement in digital form.

Another known technique for detecting signalling and data signals on a telephone channel consists in analysing the average power of the signal over short time intervals and interpreting as speech any signal whose average power fluctuates, dropping below a predetermined threshold, however this technique has difficulty in distinguishing quickly between loud speech signals and signalling or data signals.

SUMMARY OF THE INVENTION

Preferred implementations of the present invention detect signalling and data signals on a telephone channel efficiently, quickly, and in a manner which is simple to implement using digital techniques. The present invention provides a method of detecting signalling and data signals on a telephone channel by comparing the amplitude of the signal present on the telephone channel with a threshold level, the method further comprising the steps of:

measuring the maximum values of amplitude reached by the signal present on the telephone channel during successive time windows of equal duration, said duration being at least equal to the period of the lowest frequency component in the signals to be detected or to the period of the lowest beat frequency component which may be present therein, whichever period is the longer;

calculating the differences between the maximum measured amplitude values;

comparing the absolute values of the calculated differences with at least one threshold difference; and detecting signalling and/or data signals as being present each time the following detection condition is satisfied, namely: that, for the duration of a predetermined "prior activity" period comprising a plurality of consecutive time windows, said amplitude threshold level is exceeded without the difference threshold being exceeded.

A hold-over period is preferably provided at the end of any detection of signalling or data signals, during which period any signal still present on the telephone channel is treated as though it were signalling or data signals. Further, during this hold-over period the prior activity period is reduced.

In one particular implementation of the detection method, the differences are calculated between successive maximum values by taking the difference between the most recent measured maximum value and the previous measured maximum value, while at the same time the accumulated difference over non-successive maximum values is calculated by algebraically summing the differences between successive maximum values.

In the particular context of detecting telephone line or register signalling according to either of CCITT signalling systems Nos. 4 and 5, or for that matter to detecting continuity testing according to CCITT signalling systems Nos. 6 and 7, where the frequencies are in the upper part of the speech band, a simplified frequency analysis is still performed, and a detection of signalling or data signals is only enabled when the signal present on the telephone channel includes a preponderant frequency component in the upper part of the speech band. When the signal present on the telephone channel is available in the form of regular samples, the frequency analysis may be combined with the comparison of the signal amplitude with a threshold level by counting the changes of sign or absences of change of sign between successive samples whose absolute value is greater than the threshold level.

The present invention also provides apparatus for performing the above method, the apparatus comprising:

amplitude comparator means connected to compare the amplitude of the signal present on the telephone channel with a threshold level;

sequencer means connected to supply sequencing signals that determine successive time windows of equal duration, said duration being at least equal to the period of the lowest frequency component in the signals to be detected or to the period of the lowest beat frequency component which may be present therein, whichever period is the longer;

maximum value indicator means controlled by the sequencer means to deliver the maximum value reached during each time window by the amplitude of the signal present on the telephone channel;

difference indicator means connected to calculate the differences between the maximum values delivered by the maximum value indicator means;

difference estimating means connected to compare the absolute values supplied by the difference indicator means with at least one difference threshold; and detector means driven by the amplitude comparator means, the difference estimating means and the sequencer means, to deliver a signal indicating that signalling or data signals have been detected each time the following detection condition is satisfied, namely: that, for the duration of a predetermined "prior activity" period comprising a plurality of consecutive time windows, said amplitude comparator means have given an indication that said threshold level is exceeded while said difference estimating means have given an indication that the difference threshold is not exceeded.

BRIEF DESCRIPTION OF THE DRAWINGS

An embodiment of the invention is described by way of example with reference to the accompanying drawings, in which:

FIG. 3 is a circuit diagram of a level and frequency level threshold detector outlined in FIG. 1;

FIG. 4 is a circuit diagram of a detector and a hold-over time circuit outlined in FIG. 1; and FIG. 5 is a circuit diagram of a sequencer outlined in FIG. 1.

DETAILED DESCRIPTION OF THE INVENTION

The detection apparatus shown in the figures is of the digital type. It is intended for processing a telephone channel signal which is available in the form of successive digital samples. For simplicity of description, it is described as monitoring only one channel. Naturally, it could be adapted to monitoring a plurality of channels simultaneously by employing time division processing techniques.

Figure 1:
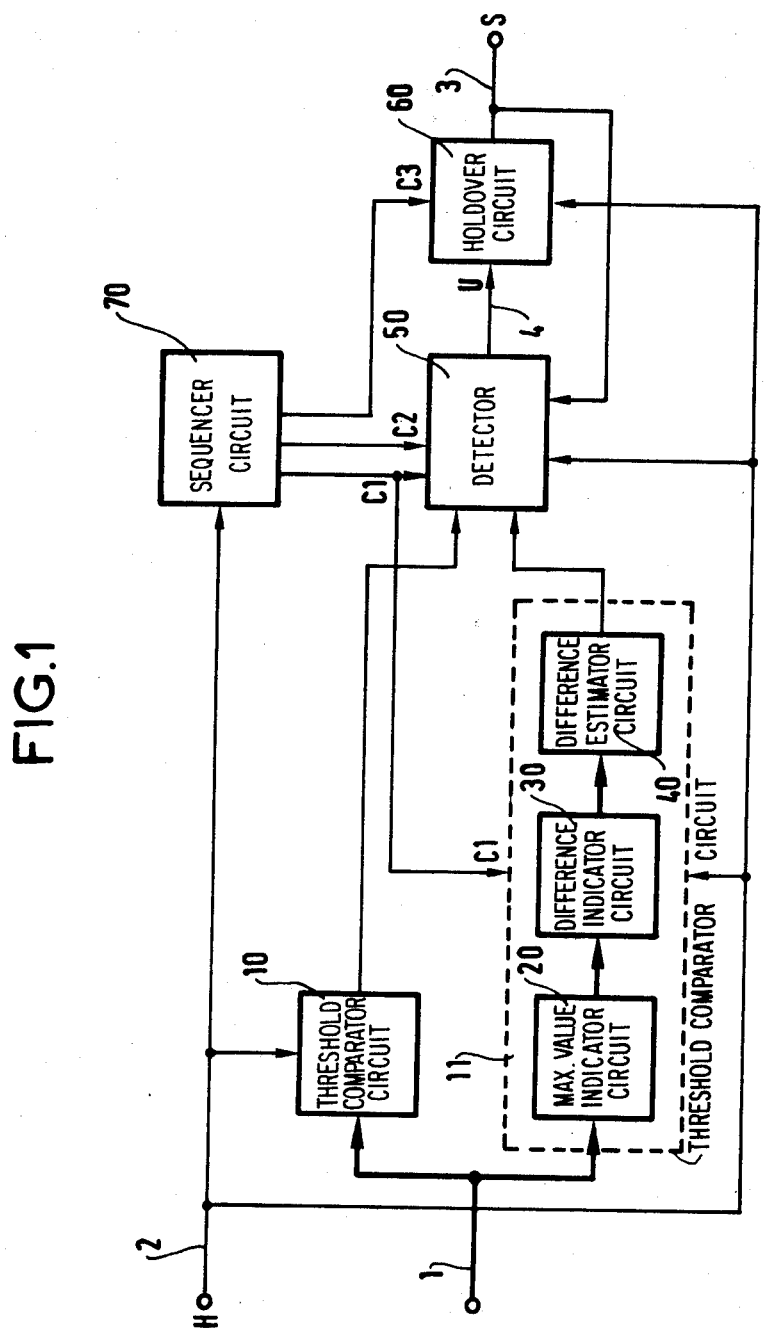
FIG. 1 is a block diagram of a detection apparatus in accordance with the invention.

As shown in FIG. 1 the apparatus has a data input 1 to which the amplitude bits and the sign bit of the digital samples of a telephone channel signal are applied in parallel, and a clock input 2 which receives a clock signal H at the sampling frequency. The apparatus also has an output 3 on which it applies a binary signal S whose state indicates whether signalling or data signals are detected as being present or absent. The apparatus comprises two threshold comparator circuits 10 and 11 connected in parallel to its input. The threshold comparator circuit 10 is sensitive to the frequency at which digital samples of amplitude greater than a given threshold level appear. The other threshold comparator 11 is sensitive to the differences between the maximum values reached by the amplitudes of the digital samples during successive time windows of equal duration. A detector 50 is controlled by both of the threshold comparator circuits 10 and 11. A hold-over circuit 60 is connected downstream from the detector 50 and delivers the output signal S. A sequencer circuit 70 provides various sequencing signals.

The frequency and level threshold comparator 10 applies a level criterion which enables it to distinguish between the presence of mere noise and the presence of a signal of any kind, including speech, other than noise. This occurs before embarking on a discrimination between speech signals and data or signalling signals. As will be seen later, it additionally makes it possible, in some applications, to make use of the particular frequency characteristics of the signals to be detected whereby an additional frequency criterion may be included in the detection of signalling or data signals. The circuit 10 is sensitive to the rate at which samples appear having amplitudes greater than a threshold level which is chosen to be above the average noise level. The rate of appearance is obtained by counting the samples which are above the threshold level by means of a counter which is also decremented at some particular frequency. For this purpose the threshold comparator 10 is connected to both of the inputs 1 and 2 to the apparatus as a whole, and provides an enable or inhibit signal to the detector 50 whenever the counter overflows its maximum value or its minimum value.

The difference threshold comparator 11 provides the actual discrimination between speech signals and signalling or data signals by employing a criterion of amplitude regularity. It comprises a maximum value indicator circuit 20 followed by a difference indicator circuit 30 and a difference estimator circuit 40. It monitors the signal present on the telephone channel during successive time windows and it serves to indicate whether the absolute maximum values reached by the amplitude of the signal during the successive windows remain close to one another or not. This criterion has turned out to be particularly effective at distinguishing between data signals which are characterised by a substantially constant average power over a short time interval and voice signals which are characterised by a highly variable average power over short time intervals. To perform its function, the difference threshold comparator 11 receives the amplitude bits applied to the signal input 1, but not the sign or polarity bit, and it also receives the clock signal H on the input 2 and a sequencing signal C1 delivered by the sequencer circuit 70 to define successive time windows of equal duration.

The detector 50 is connected to the threshold comparator 10 to receive a binary signal whose logic state indicates whether the input 1 to the apparatus is receiving a high enough rate of signal samples whose amplitudes are greater than the threshold level. It is further connected to receive a binary signal from the difference threshold comparator 11 indicating whether the differences between the maximum values are considered to be small differences. When the detector 50 has been continuously receiving logic signals from the comparators 10 and 11 throughout a "prior activity" period lasting several time windows, it triggers a binary signal U on its own output 4 to indicate that signalling or data signals have been detected. The prior activity period may have two different values (to within quantification error) depending on the logic state of the signal S available on the output 3 from the apparatus as a whole. A shorter prior activity period is used when the signal S indicates the presence of data or signalling. This increases the sensitivity of the apparatus during data transmission. In addition to the output signals from the comparators 10 and 11, the detector 50 receives the clock signal H, the sequencing signal C1 and a second sequencing signal C2 likewise generated by the sequencer circuit 70. The second sequencing signal C2 is of similar form to the signal C1, but is delayed relative thereto to take account of the time required to process the signals, including the output signal S from the apparatus as a whole which determines the choice of the duration of the "prior activity" period.

The hold-over circuit 60 is a timing circuit which systematically prolongs the logic state of the output signal U from the detector 50 corresponding to signal detection; i.e. to the detection of signalling or data signals. The signal U is extended by a hold-over period which comprises a certain number of successive time windows. The hold-over circuit 60 receives the signal U from the detector 50, the clock signal H and a sequencing signal C3 of the same form as the signal C2 but delayed relative thereto to take account of the time required to process the signals.

The various components of the apparatus described with reference to FIG. 1 are described in greater detail below for an application in which signalling is to be detected on a PCM coded telephone channel. The signalling may be line signalling, or register signalling as used in CCITT signalling systems Nos. 4 and 5, or else it may be continuity test signalling as used in CCITT telephone signalling systems Nos. 6 and 7. In any of these cases the frequencies are in the upper part of the speech band where speech signals are of relatively low power.

In this particular context, the sensitivity of the frequency and level threshold comparator is limited to the upper half of the speech band transmitted by telephone channel, i.e. to frequencies greater than 1500 or 1800 Hz, by suitably taking account of the sign of the samples during counting. The threshold level is fixed at $-23$ dBmo which is less than the minimum level expected of signalling. Choosing such a value which is considerably higher than the level of background noise found on an average telephone channel makes it possible not only to verify whether the signal present on the monitored telephone channel is other than noise, but also provides increased protection against the detection apparatus erroneously responding to whistling noises in speech, since although their frequency may be high, their level is low. The time window lasts for 6 ms, which is longer not only than the period of the lowest signalling frequency, but also than the beat period between two signalling frequencies (beats between the frequencies 2400 Hz and 2600 Hz). Taking quantizing error into account, the prior activity period is chosen to be equal to 120 ms (20 time windows) or to 24 ms (4 time windows) and the hold-over period is equal to 360 ms (60 time windows).

In the following description it will be supposed that the memories, the bistables and the counters are all sensitive to rising edges in the signals applied to their clock inputs, and that the data then taken into account by these circuits is the data which was present on their other inputs immediately before the appearance of said fronts. Further, it will be assumed that signal samples are changed on the telephone channel immediately after the rising front in the clock signal H.

Figure 2:
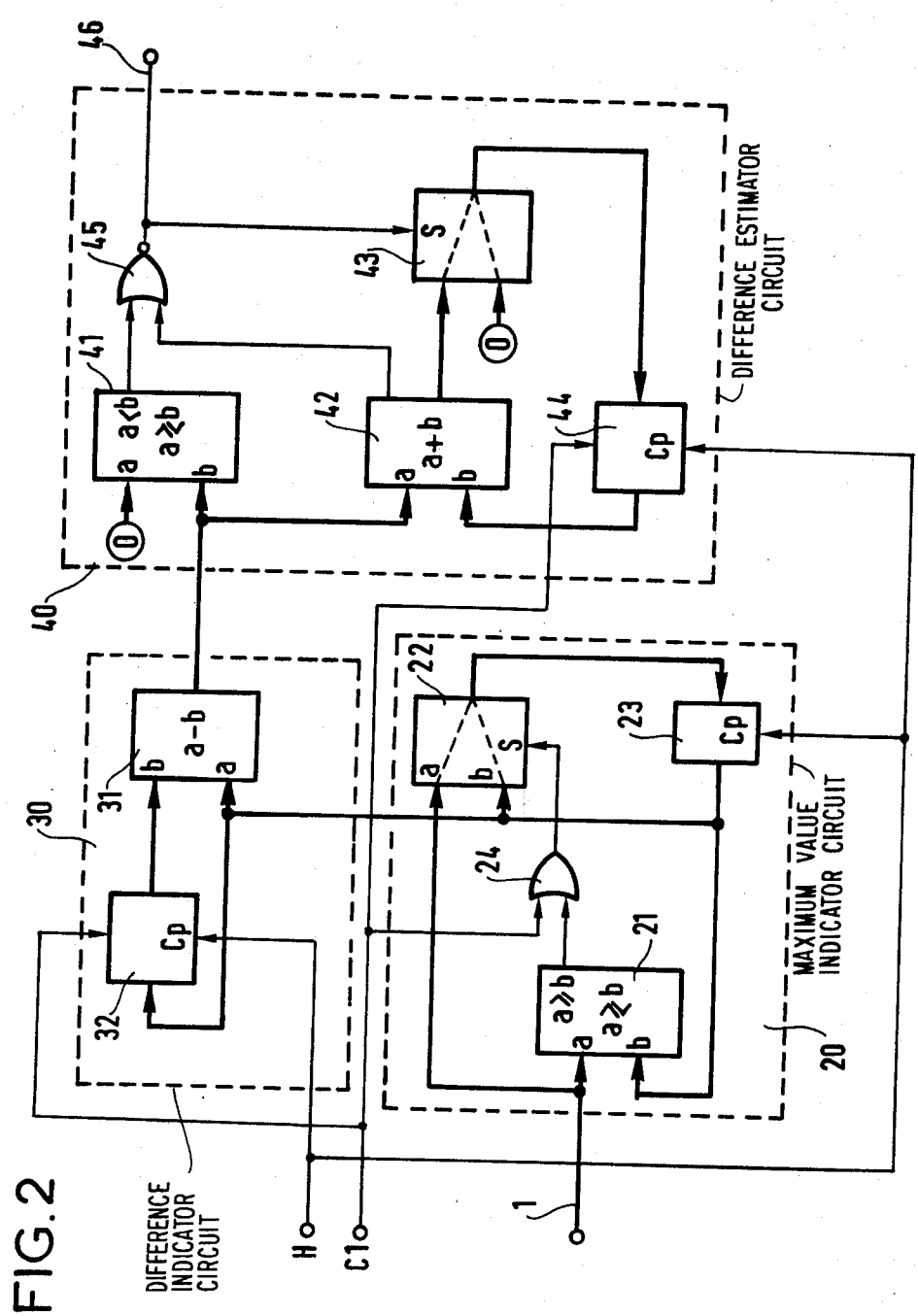
FIG. 2 is a circuit diagram of a difference threshold comparator outlined in FIG. 1.

FIG. 2 is a circuit diagram of the difference threshold comparator.

The maximum value indicator 20 is at the input end of the comparator. It comprises a digital comparator 21 having two parallel seven bit inputs connected to the input 1 of the apparatus as a whole. One of the inputs is connected directly thereto, while the other is connected via a multiplexer 22 having two parallel seven bit inputs and via a shift register 23 comprising one stage with seven bits in parallel. The shift register 23 is clocked by the clock signal H and its output is looped back to its input via said multiplexer 22. The comparator 21 controls the addressing of the multiplexer 22 in such a manner as to direct the larger of two numbers applied to its own input to the input of the shift register 23. A logic OR gate 24 inserted in the multiplexer address control line serves to inject the sequencing signal C1 to write the sample received at the beginning of each time window directly into the shift register 23.

The PCM samples applied to the input of the apparatus as a whole comprise eight bits. One of the bits is a sign bit, and the other seven bits are amplitude bits. The seven amplitude bits are applied to one of the inputs of the comparator 21 which compares the amplitude X represented thereby with the amplitude Y encoded on the seven bits stored in the shift register 23.

Each 6 ms time window extends over 48 periods of the clock H which is running at the 8 kHz sampling frequency of the PCM encoded signals. The windows begin on the rising front of the clock signal H immediately preceding a rising front in the sequencing signal C1.

During the first period of the clock signal H during the n-th time window, the sequencing signal C1 changes from logic level 1 just after the clock signal H and forces the multiplexer 22 to apply the amplitude X of the sample then present on the input 1 to the apparatus as a whole to the input of the shift register 23 where it will become available at the end of said first period. During the following period of the clock signal H, the sequencing signal C1 returns to logic level 0 just after the rising transition of the clock signal H and remains there until the end of the n-th time window, thereby leaving the addressing of the multiplexer 22 under the control of the comparator 21 which causes the larger of each pair of values X and Y to be written into the shift register 23. At the end of the last clock period in the n-th time window the maximum value MAXn is written in the shift register 23 for the duration of the first clock period in the (n+1)-th time window.

The maximum value indicator 20 is followed by the difference indicator circuit 30 which is constituted by a digital subtractor 31 having nine parallel output bits: eight amplitude bits and one sign bit, and two inputs receiving seven amplitude bits in parallel. Both seven bit signals are derived from the shift register 23, one via a direct connection and the other via a single stage seven parallel bit shift register 32 which is clocked by the clock signal H as enabled by the sequencing signal C1 applied to a clock enable input of the register 32.

Data is written into the shift register 32 by the rising edges in the clock signal H that occur while the sequencing signal C1 is at logic level 1. The register 32 thus records data at the end of the first clock period during each time window, and retains the data in such a manner that the maximum value stored in the register 23 is recorded just before being deleted from the register 23 to begin the search for a new maximum value.

Thus, during most of the first period of the clock signal H during the (n+1)-th time window there are available both the maximum value MAXn corresponding to the n-th time window as written in the first shift register 23 and not yet written into the second register 32, and also the maximum value MAXn−1 corresponding to the (n−1)-th time window which is still written in the second register 32, thereby causing their difference Δn to appear at the output from the subtractor 31.

Outside the first period of the clock signal, the subtractor delivers differences between the maximum value written in the second register 32 and the amplitudes successively written into the first register 23. These differences are not taken into account by the following circuits because the sequencing signal C1 only enables the desired difference to be taken into consideration.

The output from the subtractor 31 is connected to the difference estimator circuit 40 which comprises a digital comparator 41 and an accumulator.

The digital comparator 41 serves to verify whether the differences Δn between the successive maximum values MAXn, MAXn−1, exceed or not in absolute terms a threshold difference which in the present case is fixed at three PCM coding units.

There are two six bit parallel inputs to the digital comparator 41, one receives the six most significant bits from the output of the digital subtractor 31 while the other receives the digital value 0 encoded on six bits. The comparator 41 has a one bit output which goes to logic state 1 whenever the six most significant bits of the signal from the digital subtractor 31 correspond to a non zero digital value. Its output is connected via a logic NOR gate 45 to the output 46 of the difference estimator circuit 40.

The accumulator serves to verify whether the algebraic sum of the differences between successive maximum values exceeds or not in absolute value a threshold of three PCM coding units. It thus serves to verify whether the differences between non-successive maximum values remain small as well and do not diverge by more than six PCM coding units in absolute value. It comprises an adder/subtractor 42 having two inputs, one of which receives its output via a two input multiplexer 43 and a single stage shift register 44. The adder/subtractor 42 has two three bit inputs. One of them receives the sign bit and the two least significant bits from the subtractor 31 while the other one receives the digital values stored in the shift register 44 which has three stages in parallel, one of the bits corresponding to a sign bit and the other two being amplitude bits. The adder/subtractor algebraically sums the two three bit values it receives and delivers a four bit parallel output comprising one sign bit and two less significant amplitude bits which are applied to a first input to the multiplexer 43 and a most significant amplitude bit which is used to indicate overflow and is applied via the logic NOR gate 45 to the output 46 of the difference estimator circuit 40. The multiplexer 43 serves to reset the accumulator to zero. Its second input receives the digital value 0 encoded on one sign bit and two amplitude bits. Its addressing control is connected to the output 46 from the difference threshold comparator in such a manner as to apply the digital value 0 to the shift register 44 whenever the output from the difference estimator circuit 40 is at logic level 0. The shift register 44 has one stage of three bits in parallel and is clocked by the clock signal H after being enabled by the sequencing signal C1 which the register 44 receives on a clock enable input. It writes the value delivered from the multiplexer 43 at the end of the first clock period in each time window, i.e. at an instant when the subtractor circuit 31 is actually delivering the value of a difference between maximum values. This ensures that the accumulator only operates on said differences.

In this example the accumulator is working between −3 and +3. As soon as it overflows or underflows, or as soon as the difference between successive maximum values exceeds the difference threshold, the accumulator is reset to its mid-point which is zero. The signal I obtained at the output 46 from the difference threshold comparator is at logical level 0 during the first period of the clock signal H occupying each time window if the difference between the two most recent detected maximum values exceeds three units of the PCM code, or else if the algebraic sum of the differences between successive maximum values detected since the last time the accumulator was reset to zero exceeds in absolute value three units of PCM code. Otherwise it is at logic level 1.

FIG. 3 is a circuit diagram of the frequency and level threshold comparator.

At its input the circuit has a digital comparator 101 having two four-bit inputs, one connected to receive the four most significant bits of the PCM encoded sample present on the input to the apparatus as a whole and the other connected to receive a threshold level N in digital form, while its output is arranged to supply a level 1 logic signal whenever the amplitude of the received sample exceeds the threshold level N. The digital comparator 101 serves to eliminate samples of too small a level right from the start. The value of the threshold N is chosen to be a little less than the lowest value of signal level which may be present in the signalling to be detected. In the present case the threshold is set to −23 dBmo while the signalling level is nominally in the range 0 to −18 dBmo in CCITT No. 4 signalling system, in the range −2 to −16 dBmo in CCITT signalling system No. 5 and in the range −6 to −18 dBmo in CCITT signalling systems Nos. 6 and 7.

The output from the digital comparator 101 is connected to a sign change detector 110 for detecting changes in sign between successive samples whose level is greater than the threshold level N. The detector 110 comprises a circuit for storing the sign of the last sample but one at a level greater than the threshold N and a sign comparator circuit for comparing the sign of the last sample but one with the sign of the most recent sample having a level exceeding the threshold N. The sign storing circuit comprises a D type bistable having a data input D connected to the output of a two input multiplexer 112. One of the multiplexer inputs is connected to the Q output from the D type bistable 111, while the other of the inputs to the multiplexer 112 is connected to receive the sign bit of the input signal to the apparatus as a whole. The output from the digital comparator 101 controls the addressing of the multiplexer 112 in such a manner that the D type bistable 111 is looped so long as the samples present at the input 1 to the apparatus as a whole are lower than the threshold N. The sign comparator circuit comprises a set of three logic gates 113, 114 and 115 whose output signal is a binary signal which is at logic state 0 when the last sample available on the input 1 to the apparatus as a whole was greater than the threshold N and of opposite sign to the sign stored in the D type bistable 111, and is otherwise is at logic state 1. To do this, the gate 113 is an AND gate having an inverting input connected to the sign bit terminal of the input 1, and two non-inverting inputs connected respectively to the Q output of the D type bistable 111 and to the output from the digital comparator 101. The gate 114 is also an AND gate having an inverting input connected to the Q output from the D type bistable 111 and two non-inverting inputs connected to the output from the digital comparator 101 and to the sign bit terminal of the input 1 respectively. The third logic gate 115 is a NOR gate having two inputs respectively connected to the outputs from the AND gates 113 and 114, its output constitutes the output of the sign comparator circuit. The change of sign detector 110 drives an up/down counter 120 which serves to recognise the presence of frequency components higher than 1500 Hz in the sampled signal by counting up for changes in sign, and down for absences of sign change as weighted by a periodic correction factor.

Neglecting the level filtering which takes place upstream therefrom, the up/down counter 120 receives three changes of sign for every eight samples at 8 kHz when there is a fundamental component of 1500 Hz in the receive signal. Under these circumstances, the up/down counter can only reach an equilibrium position if it counts as many steps up as it counts down, i.e. two units must be added to the number of changes of sign detected over eight samples, and this may be done by adding one unit to the number of changes of sign at a frequency of 2 kHz. If the fundamental component is less than 1500 Hz the counter will underflow, while if the fundamental component is greater than 1500 Hz the counter will overflow in favour of too many changes of sign. Since it is desired to detect the presence of a sampled signal having a fundamental frequency component greater than 1500 Hz, overflow is the condition sought. The affect of the level filter is to reduce the number of changes of sign that are counted (this happens automatically by virtue of the wave form at the output from the sign change detector 110) whereby insufficient level is treated in the same way as too low a fundamental frequency.

The up/down counter 120 is constituted by means of a digital adder 121 for adding two four-bit numbers, an inverter 122, a multiplexer 123 having two four-bit inputs, an exclusive OR logic gate 124 having two inputs and a single stage shift register 125 for four bits in parallel.

The digital adder 121 has a first input connected to receive the number stored in the shift register 125 which constitutes the contents of the up/down counter, and a second input having its three most significant bit terminals connected in parallel to receive the sign bit from the sign detector 110 and its least significant bit connected to receive a permanent logic 1 level whereby the second input receives a number which is equal either to 15 or to 1 depending on the signal at the output from the change of sign detector 110. The digital adder 121 also has a carry input which receives a correction signal from a correction signal generator circuit 130.

The four bit sum delivered by the digital adder 121 is applied to a first input of the multiplexer 123. The second input of the multiplexer has all four input terminals connected in parallel via an inverter 122 to the output of the change of sign detector 110, giving a number equal to 0 or 15 depending on the output signal from the change of sign detector 110. The addressing of the multiplexer 123 is controlled via the exclusive OR logic gate 124, which has one input connected to receive the carry output from the digital adder 121 and another input connected to receive the output from the change of sign detector 110. A logical level 0 selects the first input and a logical level 1 selects the second input.

The output from the multiplexer 123 is connected to the input of the shift register 125 which is clocked by the clock signal H.

The correction control circuit 130 comprises a down counter 131 having a clock input clocked by the clock signal H, and an initialisation input connected to receive the number 3. Its initialisation input is active low and receives that output from the counter whose logic level is 0 when the counter contains a count of zero and is 1 otherwise. The output signal is also inverted by an inverter 132 to be applied as the correction signal for the up/down counter 120.

The down counter 131 is initialised to three and counts down at the rate of the clock signal H. When it reaches zero at the beginning of a period of the clock H, its output signal is initially at level 1 and passes to logic level 0, thereby resetting the counter to three at the beginning of the next period of the clock signal H. The result is that the output from the correction control circuit is a binary signal which is at logic level 1 for one period out of every four periods of the clock signal H.

The up/down counter 120 counts up or down each period of the clock signal H. It counts up when the change of sign detector output is at logic level 0 and it counts down when no change of sign is detected or when the sample is of insufficient level as indicated by a logic level 1 at the output from the change of sign detector 110. An additional count up is made every four periods of the clock signal H under the control of the correction control circuit 130. When the up/down counter 120 arrives at its end points of less than 0 or greater than 15, it stays at the end point until it receives a signal suitable for counting away from the end point which it has reached.

If a logic level 0 is present at the output of the change of sign detector 110, the digital adder 121 adds 1 to the contents of the shift register 125, or maybe 2 if its carry input held at logic level 1 by the correction control circuit 130. The resulting sum is written in the shift register 125 except when it exceeds 15, in which case a logic level 1 appears at the carry output from the digital adder 121 causing the second input to the multiplexer 123 to be selected which provides the number 15 for writing into the register 125 instead of the sum.

When there is a logic level 1 at the output from the change of sign detector 110, the digital adder 121 adds the number 15 to the contents of the shift register 125 or, as the case may be, the number 16 if its carry input is at logic level 1 under the control of the correction control circuit 130. If the contents of the shift register 125 is other than 0, capacity of the digital adder 121, which is only four bits, is exceeded whereby its output is either equal to the original contents of the shift register minus one or else to the original contents unchanged. The logic level 1 which appears on the carry output of the digital adder 121 is stopped by the logic exclusive OR gate 124 so that the contents of the shift register 125 is either decremented by one unit or else retained which corresponds to counting one lack of sign change, unless compensated for by a correction signal. If the contents of the shift register 125 is 0 and if the carry input is held at logic level 1 by the correction control circuit 130, operation remains the same with the digital adder 121 adding the number 16 to 0, overflowing and delivering a zero sum together with a logic level 1 on its carry output. However, its carry output is stopped by the exclusive OR gate 124 so that a 0 is rewritten into the shift register 125 which is equivalent to a one unit down count for the lack of change of sign being exactly compensated by a correction signal. Finally, if the contents of the shift register 125 is 0 when the carry input is at 0, the digital adder 121 adds 15 to 0 which does not cause it to overflow and it therefore delivers the number 15 at its output together with a logic level 0 on its carry output. The carry logic level 0 is applied to the exclusive OR gate 124 where, in combination with the logic level 1 at the output from the change of sign detector 110, it selects the second input to the multiplexer 123 on which the number 0 is permanently applied; this 0 is therefore written into the shift register instead of the sum from the adder.

The up/down counter 120 is followed by an overflow detector circuit 140 which provides a logic level 1 output at its output 150 when the up/down counter overflows, i.e. when it has counted more changes of sign than it can hold, and the detector returns to its zero output when the up/down counter underflows, i.e. when it has counted more non-changes of sign than it can hold. This provides a degree of hysteresis which avoids hunting. The detector circuit 140 comprises three logic gates 141, 142 and 143 together with a D type bistable 144.

The D type bistable 144 has its data input connected to the output 150 of the overflow detector circuit 140. It is clocked by the clock signal H and during each clock period it retains the previous state of the output of the overflow circuit 140. The logic gate 141 is a NOR gate having two inputs, one of which is connected to the Q output of the D type bistable 144 and the other of which is connected to the output of the exclusive OR gate 124 which delivers the overflow signal from the up/down counter 120. The logic gate 142 is an AND gate having two inputs, one of which is connected to the output of the logic gate 124 and the other of which is connected to the output of the change of sign detector 110. The logic gate 143 is a NOR gate having two inputs which are connected to the outputs of the logic gates 141 and 142 respectively. The output from the logic gate 143 delivers the output signal from the overflow detector circuit 140.

Whenever the up/down counter 120 is not hard against one of its limit values of 0 and 15 for the duration of a clock signal H, the output from the exclusive OR logic gate 124 is at logic level 0 thereby making the set of three logic gates 141, 142 and 143 transparent to the output state of the D type bistable 144. The overflow detector circuit 140 thus retains the output level on its output 150 which it had during the previous period of the clock H. This is its hysteresis interval.

In contrast, whenever the up/down counter 120 is against one of its end stops for the duration of a clock period under consideration, the exclusive OR logic gate 124 is at logic level 1 causing the set of three logic gates 141, 142 and 143 to act as an inverter to the output state of the change of sign detector 110, i.e. it goes to logic level 1 when a change of sign has been detected indicating that the counter has overflowed and it gives a logic level 0 when no change of sign has been detected indicating that the counter has underflowed.

It will be observed that the overflow detector circuit 140 could be designed to change state when the up/down counter 120 reaches a count equal to one of its limit states rather than waiting for it to overflow or underflow. Although such a circuit would require more components in the up/down counter since its output state would need to be decoded, it would slightly speed up the reaction time of the frequency and level threshold comparator.

FIG. 4 is a circuit diagram of the detector 50 and the hold-over circuit 60 shown in FIG. 1.

At its input, the detector 50 has a two-input logic AND gate 52 having its inputs connected to the outputs 46 and 150 of the difference estimator circuit 40 and the overflow detector circuit 140 respectively. The output from the AND gate 52 is connected to the data input of a D type bistable 51. The D type bistable 51 is clocked by the clock signal H and has a clock enable input connected to receive the sequencing signal C1, whereby it is activated at the end of the first clock period at the beginning of each time window. The D type bistable 51 thus serves to resynchronise the signals present on both of the inputs to the AND gate 52, and also to enable only those output signals from the difference threshold comparator (11 FIG. 1) that are relevant.

The output from the D type bistable 51 is at logic level 1 whenever the condition of regular amplitude and the conditions of suitable level and frequency have all been satisfied during the preceding time window, and it is at logic level 0 otherwise.

The circuit 50 further includes a two-speed time counter which remains blocked against its upper limit and which is reset to zero by a logic level 0 at the Q output from the D type bistable 51 which indicates that at least one of the conditions is not satisfied. The two counting speeds are a high speed equal to the rate of the sequencing signal C1 which is applied when the apparatus as a whole has detected a signal, i.e. when the output 3 from the apparatus as a whole is at logic level 1 indicating that signalling or a data signal is present on a telephone channel, and a slow speed equal to one-fourth of the fast speed which is used when the apparatus as a whole has not detected a signal in the telephone channel, i.e. when the output 3 of the apparatus as a whole is at logic level 0. The time counter is essentially constituted by a digital adder 53 for adding two three bit numbers, a multiplexer 54, and a single stage shift register 55 for shifting three bits in parallel.

The digital adder 53 has one input connected to the output of the shift register 55 and its other input has its two most significant bits connected to ground (logic level 0), and its least significant bit connected to the output of a logic OR gate 56 having two inputs. One of the inputs to the OR gate 56 is connected to receive the signal on the output 3 from the apparatus as a whole, and the other input is connected to receive a timing signal P whose period extends over four time windows having a logic level 1 maintained for the duration of one time window and which is synchronised on the sequencing signal C1. The logic OR gate 56 serves to apply the number 1 to one of the inputs of the digital adder 53, either permanently while the apparatus as a whole has its output at logic level 1, or else during one time window in four while the output from the apparatus as a whole is at logic level 0. At its output, the digital adder 53 delivers the sum of the number which is stored in the shift register 55 added to the number 0 or the number 1 as the case may be.

The multiplexer 54 has one of its three bit inputs connected to the three bit output of the digital adder 53, and the three terminals of its other three bit inputs are connected in parallel to the Q output of the D type bistable 51. The multiplexer addressing control operates in such a manner that the output from the digital adder 53 is selected when the addressing input is at logic level 1. The addressing input is controlled by a logic AND gate 57 having two inputs, one of which receives the output from the D type bistable 51 and the other of which receives the inverse of the carry output from the digital adder 53.

The one stage and three parallel bit shift register 55 has its input connected to the output of the multiplexer 54 and it is clocked by the clock signal H when enabled by the sequencing signal C2 which is of the same wave form as the sequencing signal C1 but which is delayed relative thereto by one period of the clock signal H. The enable input to the register 55 is connected to the sequencing signal C2 is order to take account of the fact that the D type bistable 51 which resynchronises the output signals from the difference threshold comparator and the frequency and level comparator is itself only activated at the end of the first period of the clock signal in each time window.

When a logic level 0 signal is present at the output of the D type bistable 51 during the second period of the clock signal H in any given time window, thereby indicating that at least one of the conditions was not satisfied during the preceding time window, the multiplexer 54 selects its input which is not connected to the digital adder 53, thereby putting all three bits in parallel to logic level 0. A number 0 therefore appears at the output of the mulitplexer 54 and this is stored in the shift register 55 at the end of the second period of the clock signal H during the time window under consideration. The contents of the up/down counter is thus either reset to zero or maintained at zero.

When a logic level 1 signal is present at the output from the D type bistable 51 during the second period of the clock H during the time window under consideration, indicating that the conditions were satisfied during the preceding time window, and when a logic level 0 is present on the carry output from the digital adder 53 indicating that the sum obtained therein does not exceed 7 (the top limit of the capacity of the time counter), the multiplexer 54 selects its input connected to the output of the digital adder 53 thereby causing said sum to be stored in the shift register 55, and consequently incrementing the time counter by one unit at the end of the second period of the clock signal H during the time window under consideration, provided that the output 3 from the apparatus as a whole is at logic level 1 indicating that signalling has been detected, or providing that the timing signal P is at logic level 1. In one case counting occurs at a rate of one count every 6 ms, which is the period of the sequencing signal C1, i.e. one count per time window, while in the other case counting takes place at a rate of one unit every 24 ms (the period of the timing signal P), i.e. one unit every four time windows. The purpose of these two counting speeds is to obtain the two different "prior activity" periods mentioned before. When a logic level 1 is present at the output of the D type bistable 51 during the second period of a clock signal H during a time window under consideration, indicating that the conditions were satisfied during the previous time window, and when a logic level 1 is present on the carry output from the digital adder 53 indicating that the sum obtained exceeds the number 7 (111 in binary) which is the upper limit of the capacity of the time counter, the multiplexer 54 selects its input which is not connected to the output from the digital adder 53. This input receives the logic level 1 from the output of the D type bistable 51 on all three bit terminals, thereby delivering the number 7 at its output which is again stored in the shift register 55 at the end of the second period of the clock signal H during the time window under consideration, whereby the time counter remains blocked against its upper limit.

The timing signal P used to define the slower counter speed is generated from the sequencing signal C1 by means of an inverter 80 driven by a divider 81 which has a clock input connected to receive the sequencing signal C1, an initialising input connected to receive the number 3, and an initialising enable input which is active low connected to receive an output signal from the divider which indicates whether the divider is at logic level 0 or not. The divider 81 is initialised to 3 and counts down at the time window rate. When it arrives at zero, its output signal which was previously at logic level 1 changes to logic level 0, thereby causing the number 3 to be rewritten into the divider at the beginning of the next time window. The result is that the output from the inverter 80 provides a timing signal P which is at logic level 1 during one time window in four.

The time counter is followed by a decoder circuit for observing those instants when the contents passes through the value 4 providing the output from the apparatus as a whole is at logic level 1, or through the value 5 if the output from the apparatus as a whole is at logic level 0. This decoding circuit comprises a digital comparator 58 having two three-bit inputs, one of which is connected to the output from the shift register 55 and the other of which receives the number 5 encoded on the bits. The output from the comparator 58 goes to logic level 1 when the contents of the time counter is greater than or equal to the number 5. This output is connected to one input of a multiplexer 59 having two one-bit inputs, the other of which is connected to the most significant bit of the output from the shift register 55. The multiplexer 59 is addressed by the signal present on the output 3 from the apparatus as a whole in such a manner as to select the input connected to the digital comparator 58 when there is a logic level 0 at the output 3 and to select the other input when there is a logic level 1.

When a logic level 0 is present in the output 3 of the apparatus as a whole, indicating that no signalling has been detected, the time counter, if it is counting at all, is counting at its slow speed while the multiplexer 59 selects the output from the digital comparator 58 and provides an output signal at logic level 0 for as long as the contents of the counter remains less than 5, which corresponds to a prior activity period of 120 ms.

When a logic level 1 is present on the output 3 of the apparatus as a whole indicating that signalling has been detected, the time counter, when it is counting, is counting at its faster speed and the multiplexer 59 selects the most significant bit from the output of the shift register 55 thereby outputting a logic level 1 signal for as long as the contents of the counter remains below four, which corresponds to a prior activity period of 24 ms.

The OR gate 56 and the multiplexer 59 constitute, as has just been described, means for adjusting the duration of the prior activity period and enable a shorter duration to be obtained during the hold-over period.

The signal U available at the output from the multiplexer 59 takes logic level 1 or 0 depending on whether the apparatus has recognised the presence of signalling in the monitored channel, and is applied to the hold-over circuit 60. The hold-over circuit 60 is essentially constituted by a time divider which operates at the rate of the timing signal P and which is reset to its maximum value by a logic level 1 at the output 4 from the multiplexer 59. The time divider is constituted by a digital adder 61 having two four bit inputs, a multiplexer 62 having two four-bit inputs, and a shift register 63 having four bits in parallel and one stage.

The digital adder 61 has a first input connected to the output of the shift register 63 whence it receives a four bit number which is stored therein and which constitutes the contents of the time divider, and it has a second input whose four bit terminals are connected in parallel to the output of a logic AND gate 64 to provide a number equal to 0 or 15 (1111 in binary). The logic AND gate 64 has two inputs, one of which receives the output from the apparatus as a whole and the other of which receives the timing signal P.

The multiplexer 62 has a first input connected to receive the output signal from the digital adder 61, and a second input with its four bit terminals connected in parallel to the output 4 from the multiplexer 59 to receive a number equal to 0 or 16. The multiplexer is addressed by the multiplexer 59 in such a manner as to select its input connected to the output from the digital adder 61 when the output from the multiplexer 59 is at logic level 0 which indicates that no signalling has been detected, and select its other input in the contrary case.

The shift register 63 has one four-bit stage, and has its input connected to the output of multiplexer 62. It is clocked by the clock signal H as enabled by a sequencing signal C3 which has the same form as the sequencing signal C2 but which is delayed relative thereto by two periods of the clock signal H. Enabling by means of sequencing signal C3 enables the register 63 to take account of the fact that the shift register 55 is not written to until the end of the second period of the clock signal H during each time window.

A four input logic OR gate 65 is connected to the output from the shift register 63 and delivers the output signal S of the apparatus as a whole. This signal S is at logic level 1 provided that at least one of the bits of the time divider is other than zero.

When a logic level 1 is present on the output 4 from multiplexer 59, indicating that signalling has been detected, the multiplexer 62 selects its input which is not connected to the digital adder 61 and whose four bits are connected in parallel to logic level 1. As a result the number 15 appears at its output which is the maximum contents of the time divider, and this number is stored in the shift register 63 which causes a logic level 1 to appear at the output 3 of the apparatus as a whole. A logic level 1 at the output 4 of the multiplexer 59, indicating that signalling has been detected, is thus forwarded to the output 3 of the apparatus as a whole while resetting the time counter to its maximum value.

When a logic level 0 is present on the output 4 from the multiplexer 59, indicating that no signalling has been detected, the time counter returns to the value zero if it was not already there or remains at zero if it was already there. If it was not at zero, the output 3 from the apparatus as a whole is at logic level 1, and the apparatus as a whole continues to indicate the presence of signalling, thereby opening the logic AND gate 64 which passes the timing signal P. This signal is at logic level 1 for one window in four, and applies the value 15 to the input of the digital adder 61 every 24 ms. The value 15 is added with the contents of the time counter by the digital adder 61 which overflows and delivers at its output the contents of the time counter decremented by unity. If the logic level 0 remains at the output of the multiplexer 59, the output signal from the digital adder 61 is written into the shift register 63 and again serves as a new time divider contents. When the contents of the time divider reaches zero, the output 3 from the apparatus as a whole passes to logic state 0, and the apparatus as a whole ceases to indicate the presence of signalling, and at the same time closes the logic AND gate 64 thereby preventing the time counter from counting down any further.

The hold-over period thus obtained is 360 ms (to within quantification error).

FIG. 5 is a circuit diagram of the sequencing signal generator 70. It comprises a wave shaping circuit constituted by an inverter 51 driven by a divider 72 which has a clock input connected to receive the clock signal H and an initialising input connected to receive the number 47. It has an inverting initialising control input which is connected to receive its own output signal, and it has a phase shifting circuit constituted by a shift register 73 having three stages connected in series to the output of the inverter 71 and clocked by the clock signal H.

The divider 72 is initialised with the value 47 and counts down at the rate of the clock signal H. When it arrives at zero its output signal which was previously at logic level 1 passes to logic level 0, thereby causing the divider 72 to be reset to 47 at the beginning of the following period in the clock signal H. As a result, the output from the inverter 71 is a binary signal which passes to logic level 1 for one period in forty-eight of the periods of the clock H.

The shift register provides the three sequencing signals C1, C2 and C3 which are shifted relative to each other by one unit of the clock signal H.

We claim:

1. A method of detecting predetermined signals, e.g., signalling and data signals, on a telephone channel by comparing the amplitude of the signal present on the telephone channel with a threshold level, the method further comprising the steps of:
measuring the maximum values of amplitude reached by the signal present on the telephone channel during successive time windows of equal duration, said duration being at least equal to the period of the lowest frequency component in the signals to be detected or to the period of the lowest beat frequency component which may be present therein, whichever period is the longer;
calculating the differences between the maximum measured amplitude values;
comparing the absolute values of the calculated differences with at least one threshold difference; and
detecting said predetermined signals as being present each time the following detection condition is satisfied, namely: that, for the duration of a predetermined "prior activity" period comprising a plurality of consecutive time windows, said amplitude threshold level is exceeded without the difference threshold being exceeded.

2. A method according to claim 1, wherein the differences are calculated between consecutive maximum amplitude values.

3. A method according to claim 2, wherein the differences are also calculated between non consecutive maximum amplitude values, by algebraically summing the differences between consecutive maximum amplitude values.

4. A method according to claim 3, wherein said predetermined signals continue to be detected as being present for a predetermined "holdover" period after the original detection condition has ceased to be satisfied.

5. A method according to claim 4, wherein the number of successive time windows constituting said prior activity period is reduced for the duration of said holdover period.

6. A method according to claim 1, applied to the detection of telephone signalling situated in the upper part of the speech band, wherein the frequencies in the signal present on the telephone channel are analysed to determine whether there exists a fundamental frequency component in the upper part of the speech band, and wherein detection of said predetermined signals is inhibited when such a frequency component is not found to exist.

7. A method according to claim 6, applied to the detection of telephone signalling situated in the upper part of the speech band, in a telephone channel whose signal is available in the form of regularly spaced samples, wherein the search for fundamental frequency components in the upper part of the speech band is combined with the comparison of the amplitude of the signal present on the telephone channel with said threshold level by counting changes in sign and absences of change in sign between successive samples having an amplitude greater than the threshold level.

8. Apparatus for detecting predetermined signals, e.g. signalling and data signals, on a telephone channel by comparing the amplitude of the signal present on the telephone channel with a threshold level, measuring the maximum values of amplitude reached by the signal present on the telephone channel during successive time windows of equal duration, said duration being at least equal to the period of the lowest frequency component in the signals to be detected or to the period of the lowest beat frequency component which may be present therein, whichever period is the longer, calculating the differences between the maximum measured amplitude values, comparing the absolute values of the calculated differences with at least one threshold difference, and detecting said predetermined signals as being present each time that said amplitude threshold level is exceeded without the difference threshold being exceeded for the duration of a predetermined "prior activity" comprising a plurality of consecutive time windows, said apparatus comprising:

amplitude comparator means connected to compare the amplitude of the signal present on the telephone channel with said threshold level, sequencer means connected to supply sequencing signals that determine said successive time windows of equal duration, said duration being at least equal to the period of the lowest frequency component in the signals to be detected or to the period of the lowest beat frequency component which may be present therein, whichever period is the longer;

maximum value indicator means controlled by the sequencer means to deliver the maximum value reached during each time window by the amplitude of the signal present on the telephone channel;

difference indicator means connected to calculate the differences between the maximum values delivered by the maximum value indicator means;

difference estimating means connected to compare the absolute values supplied by the difference indicator means with at least one difference threshold; and detector means driven by the amplitude comparator means, the difference estimating means and the sequencer means, to deliver a signal indicating that signalling or data signals have been detected each time the following detection condition is satisfied, namely: that, for the duration of said predetermined "prior activity" period comprising a plurality of consecutive time windows, said amplitude comparator means have given an indication that said threshold level is exceeded while said difference estimating means have given an indication that the difference threshold is not exceeded.

9. Apparatus according to claim 8, wherein the difference indicator means comprise:

a memory for storing the last but one maximum value delivered by the maximum value indicator means; and a subtractor connected to calculate the difference between the last maximum value delivered by the maximum value indicator means and the last but one maximum value stored in said memory.

10. Apparatus according to claim 9, wherein the difference estimating means comprise:

a first threshold comparator connected to receive the differences delivered by the subtractor, and to indicate whether or not their absolute values are less than a difference threshold; and an accumulator of limited capacity connected to sum the differences delivered by the subtractor algebraically, said accumulator overflowing when the absolute value of said algebraic sum exceeds the difference threshold, and being reset to its average value after each overflow.

11. Apparatus according to claim 8, further comprising holdover timing means connected downstream from detector means to extend the duration of each detection of signalling or data signals after said detection condition has ceased to be satisfied.

12. Apparatus according to claim 11, further comprising means for adjusting the length of said prior activity period, connected in such a manner that, during said holdover period, the number of successive time windows that constitute said prior activity period is reduced.

13. Apparatus according to claim 8, for use in detecting telephone signals situated in the upper part of the speech band in a telephone channel signal which is available in the form of successive samples delivered at a regular rate, wherein the amplitude comparator means include a sample selector connected to ignore all samples of amplitude less than said threshold level, and combined with up/down counting high frequency detector means having a start frequency in the middle of the voice band and operating on the basis of the samples delivered by the sample selector to give an indication which is simultaneously representative of the threshold level being exceeded and of the presence of a fundamental frequency component in the upper part of the speech band.

* * * * *